UNITED STATES PATENT OFFICE.

AUGUST SAMUEL FREDRIC LOHMANN, OF DALLAS, TEXAS.

COMPOSITION OF MATTER.

No. 861,132.  Specification of Letters Patent.  Patented July 23, 1907.

Application filed February 4, 1907. Serial No. 355,648.

*To all whom it may concern:*

Be it known that I, AUGUST SAMUEL FREDRIC LOHMANN, a citizen of the United States, residing at Dallas, in the county of Dallas and State of Texas, have invented a new, practical, and useful composition of matter for the manufacture of a cheap commercial artificial fuel (briquets) out of brown coal, lignite, peat, etc., which exist in different portions of the United States in vast deposits and of superior quality.

The moisture of Texas lignite generally varies from twelve to twenty five percent, and this lignite, etc. when treated according to my improved method yields a cheap fuel at a handsome profit.

After a number of years passed in careful experiments, I find the essential a practical, cheap binding material, which promises to manufacture an artificial fuel from lignite, etc., for the commercial trade, and which is equal to the best bituminous coal for steam and heating value. Tar is one of the main substances valuable as binder for the purpose of manufacturing artificial fuel, and I secure the tar from the crude lignite through a dry distillation process; the tar is secured through the necessary apparatus. This gives a brownish grease; a very sticky substance, and much cheaper, better, etc., than the high priced imported hard pitch. I also secure through distillation from crude lignite, photogen, which is equivalent to kerosene oil, only the photogen is heavier and stronger smelling than the kerosene oil. Both tar and photogen are excellent substances as binder, and increase the caloric value of the carbon—both steam and heating value—when lignite, etc., are utilized as artificial fuel. Gilsonite, a mineral substance which can be purchased in the United States, which resembles carbon, and tends to make the artificial fuel solid and hard. Magnesian cement, the rough material to prepare said magnesian cement as chlormagnesium, etc., is imported, and its character is to keep the artificial fuel hard and firm, and prevent breakage from transportation. Creosote, a substance which can be secured by distillation from brown coal, lignite, peat, etc., gives the tar and photogen more cohesive and durable value. I find it useful to crush the crude lignite and let the crushed lignite go through a four-mesh sifter, and also the binding composition is ground, before the above mentioned composition substance is mixed with the lignite, and when the lignite and composition substance are mixed thoroughly by heating process, the mass may be formed into any shape or in any weight into a briquet press, and as soon as the mass is formed, the briquet can be handled at once. The briquets manufactured as above mentioned and specified, are clean, firm, cohesive in fire, durable and solid for far transportation, nearly smokeless—no cinders, less ashes, etc. The formula given below is the one which I prefer to use in the manufacture of my product. I am aware that tar, oil, etc., has been used and patented, but I am not aware that all the ingredients of my composition have been used together.

*Formula.*—Lignite eighty-three (83) percent; tar eight (8) percent; photogen three (3) percent; creosote one (1) percent; gilsonite four (4) percent; magnesian cement one (1) percent. These proportions are by weight.

What I claim and desire to secure by Letters Patent of the United States, is:

1. An artificial fuel consisting of coal, tar, photogen, creosote, gilsonite, magnesian cement, substantially as described.

2. An artificial fuel consisting of the following ingredients, viz: lignite eighty-three (83) per cent.; tar eight (8) per cent.; photogen three (3) per cent.; creosote one (1) per cent.; gilsonite four (4) per cent.; magnesian cement one (1) per cent., substantially as described.

AUGUST SAMUEL FREDRIC LOHMANN.

Witnesses:
THOS. S. PLOWMAN,
F. J. HENGY.